3,000,651
PNEUMATIC SUSPENSION FOR VEHICLES WITH MEANS FOR PREVENTING UNDUE SWAY OF THE VEHICLE
Rene Gouirand, 210 W. 88th St., New York, N.Y.
Filed Sept. 12, 1960, Ser. No. 55,270
5 Claims. (Cl. 280—124)

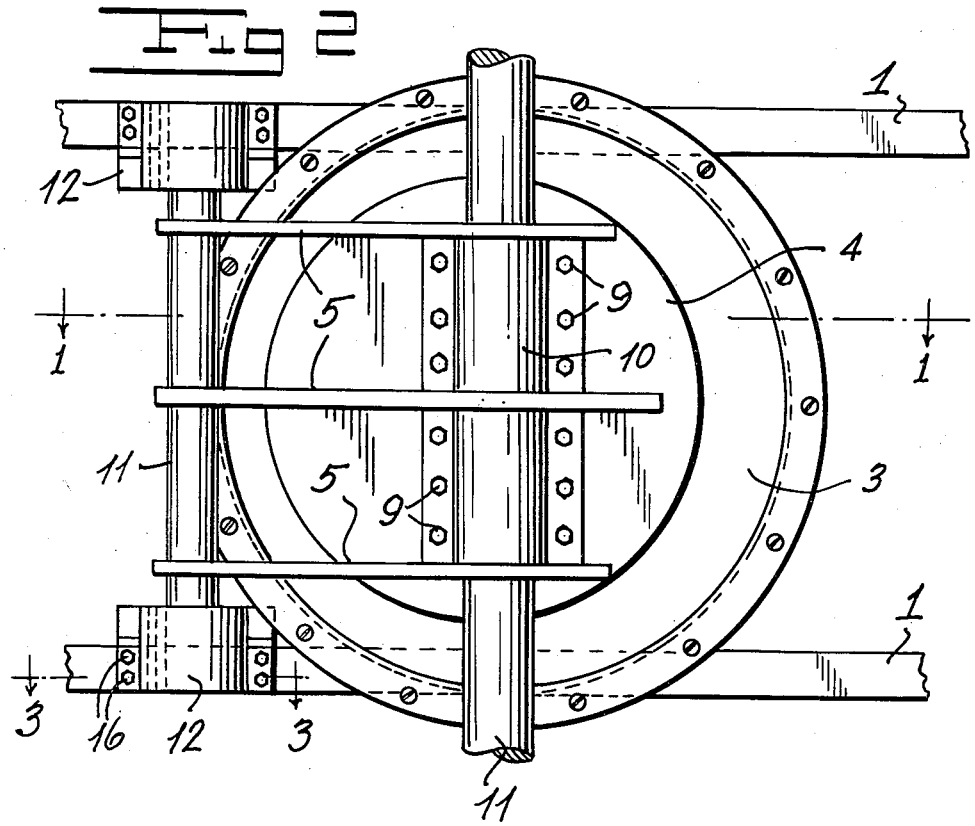
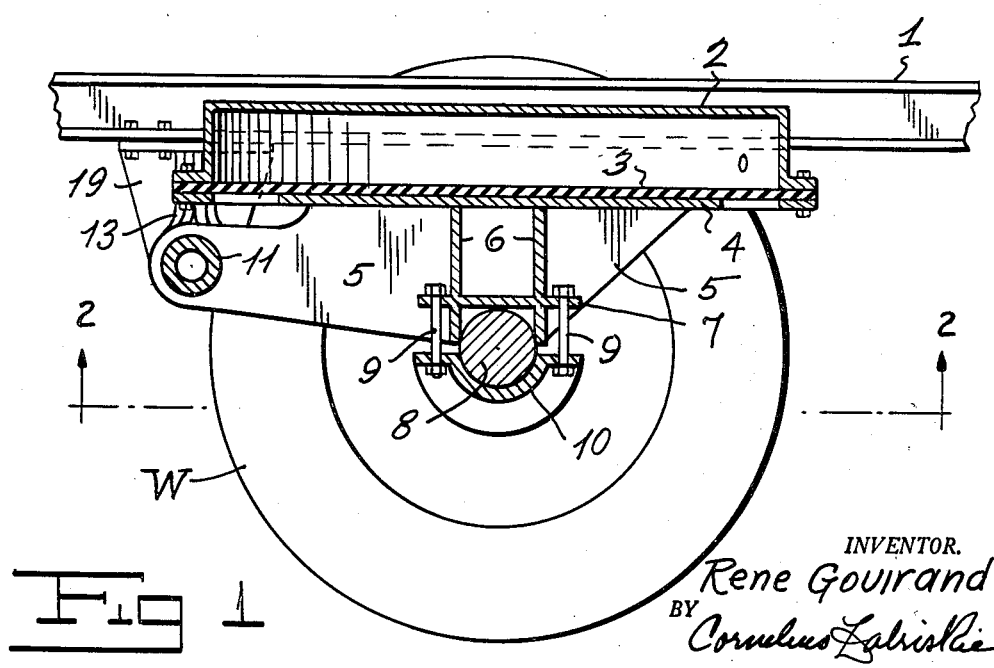

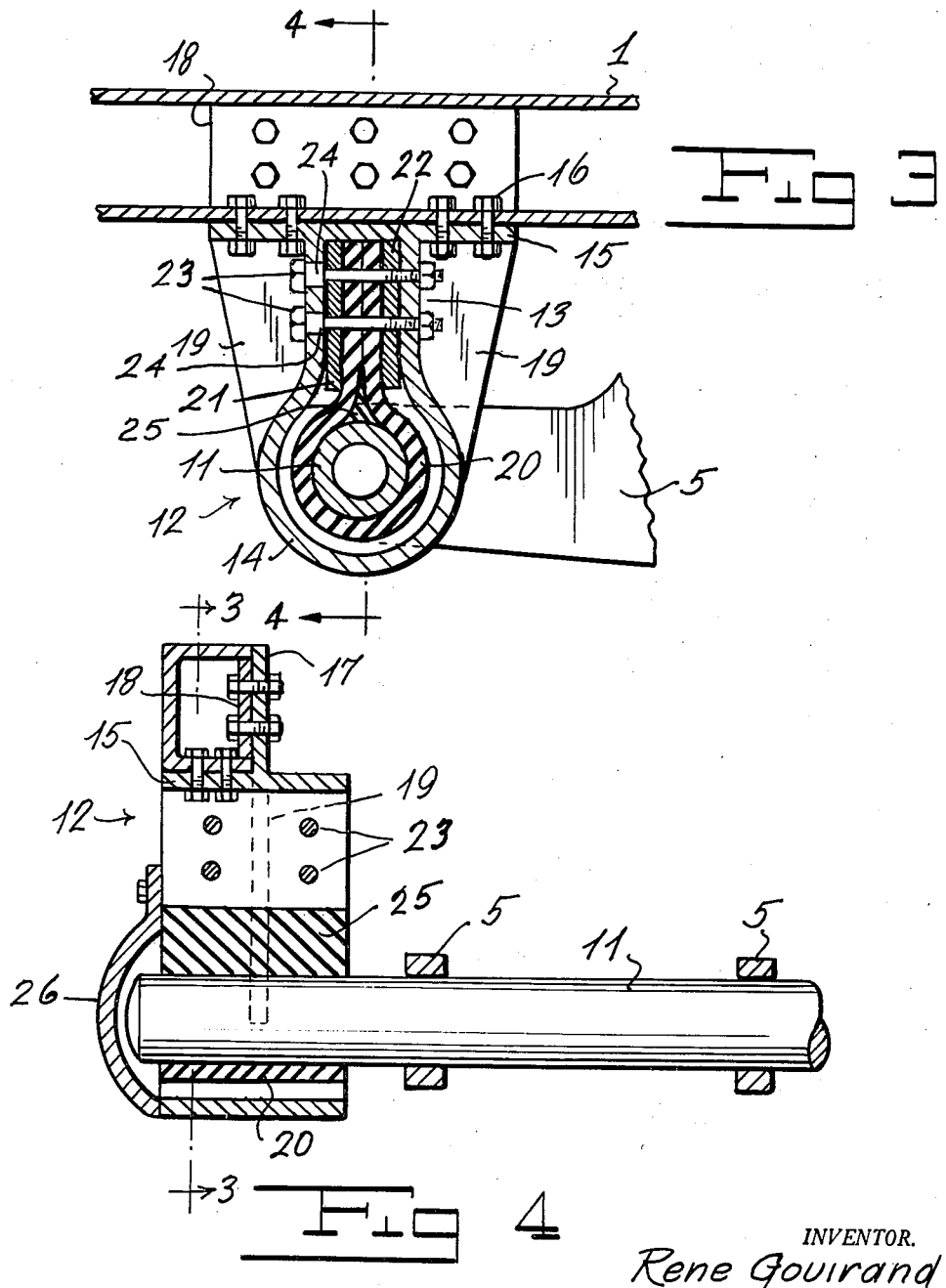

This invention relates to pneumatic suspensions for vehicles of all kinds.

The object of the invention is to provide a pneumatic suspension which will be highly flexible, will support the body of the vehicle for slight sway without placing any of the operating parts of the suspension under undue stress.

An important feature of this invention is the provision of a sway bar operatively connected to the axle with novel and efficient means for supporting said sway bar in a manner to permit freedom of action of pneumatic suspension while adequately controlling any tendency of the vehicle to unduly sway when passing over uneven roads or about curves.

Features of the invention, other than those adverted to, will be apparent from the hereinafter detailed description and appended claims, when read in conjunction with the accompanying drawings.

The accompanying drawings illustrate one practical embodiment of the invention, but the construction therein shown is to be understood as illustrative, only, and not as defining the limits of the invention.

FIG. 1 is a fragmental longitudinal section of a vehicle embodying the present invention, said section being taken on the line 1—1 of FIG. 2.

FIG. 2 is an underneath plan view of the suspension shown in FIG. 1.

FIG. 3 is a fragmental section taken on the line 3—3 of FIGS. 2 and 4.

FIG. 4 is a section taken on the line 4—4 of FIG. 3.

Referring to the drawings, 1 designates the chassis frame of a vehicle to which is secured a compressed air casing 2, the open bottom of which is closed by a flexible diaphragm 3 to form a compressed air chamber within said casing. To the bottom of said diaphragm is secured a rigid plate 4 and to the under side of said plate are secured a series of longitudinal fins 5 and transverse fins 6. To the transverse fins 6 is secured a transverse plate 7. The axle 8 is secured to the plate 7 by bolts 9 passed through a cap 10, as shown best in FIG. 2. In this way the axle is secured to the diaphragm and serves to support the chassis and load on the vehicle by virtue of compressed air contained within the casing 2, as shown best in FIG. 1 wherein one of the wheels is indicated at W.

The longitudinal fins 5, shown three in number in FIG. 2, are extended longitudinally of the vehicle to form arms, the ends of which are perforated to embrace a sway bar 11 which extends transversely of the vehicle. The ends of said sway bar are supported from the longitudinal bars of the chassis frame 1 by means of sway cushion bearing supports, indicated generally at 12 and shown in detail in FIGS. 3 and 4.

Each of these supports may conveniently be in the form of a metal casting comprising a loop shaped fitting having a neck portion 13 and a looped portion 14. The neck portion is shown as having an integral horizontal plate 15 which is secured by bolts 16 to one of the side bars of the frame 1 and said plate has an upstanding flange 17 which is bolted to a reinforcing insert 18 on said side bar, so as to rigidly support a fitting on such side bar of the chassis frame. Each fitting is preferably provided with reinforcing webs 19.

The fittings are mounted on the chassis frame in such position that the sway bar 11 and the loop-shaped portions 14 of the two fittings are normally substantially concentric with the sway bar spaced from the corresponding loop-shaped portions 14.

Positioned within each of the loop-shaped fittings is an elastic sling 20. The looped portion of this sling closely embraces the corresponding end of the sway bar, while the neck of the sling is housed within the neck of the corresponding fitting and interposed between two rigid plates 21 and 22, the former of which is a pressure plate. Bolts 23 pass through the neck shaped portion of the fitting and each of these bolts has adjacent to its head an enlarged portion 24 which fits loosely through the corresponding side of the fitting and bears against the pressure plate 21. When the bolts 23 are tightened, the pressure plate 21 is drawn tightly against the neck of the elastic sling and thus secures it tightly to the fitting as shown in FIG. 3.

It is to be noted in that figure that the looped end of the sling is normally spaced from the corresponding portion of the fitting a sufficient distance to permit normal operation of the suspension without contact between the loop end of the elastic sling and the fitting, but the spacing is such that under undue strains, such contact may be made as a safety measure against undue straining of the sling. An elastic filler 25 is preferably fitted into the sling between the sway bar and the neck of the sling so as to ensure tight and firm engagement between the elastic sling and said sway bar. The opposite ends of the sway bar are enclosed by caps 26, as shown in FIG. 4.

The structure described allows of proper movement of the axle as it passes over uneven roads and permits proper flexing of the diaphragm, while adequately safeguarding all of the parts against undue strain for the elastic loops are sufficiently flexible and resilient to permit the movements referred to, which would not be true if the sway bar were rigidly supported on the chassis frame.

The foregoing detailed description sets forth the invention in its preferred practical forms, but the invention is to be understood as fully commensurate with the appended claims.

Having thus fully described the invention, what I claim as new and desire to secure by Letters Patent is:

1. A vehicle comprising: a chassis frame, a compressed air chamber connected to the frame, a diaphragm at the bottom of said chamber, a wheeled axle secured to the diaphragm, arms rigid with the axle and projecting longitudinally of the frame, flexible slings connected to said arms and anchored to the chassis frame, and loop-shaped fittings enclosing said slings.

2. A vehicle comprising: a chassis frame, a compressed air casing on said frame, a diaphragm extending across the open bottom of said casing to form therein a compressed air chamber, an axle secured to said diaphragm, arms rigid with the axle for extending longitudinally of the frame and engaging a sway bar extending transversely of the frame, and sway bar cushion supports embodying fittings secured to the frame and embracing said sway bar and elastic slings carried by said fittings and closely looped about the sway bar with the looped portions of said slings normally free from contact with said fittings.

3. A vehicle according to claim 2, wherein each fitting is a rigid fitting.

4. A vehicle according to claim 2, wherein such fittings are positioned to embrace the opposite end portions of the sway bar.

5. A vehicle according to claim 2, wherein each fitting comprises a depending substantially loop-shaped portion within which the neck of the corresponding sling is positioned, a pressure plate bearing against the neck of said sling, and bolts extending through the fitting and through the pressure plate for tightly binding said sling to the fitting.

References Cited in the file of this patent

UNITED STATES PATENTS

| | | |
|---|---|---|
| 1,687,057 | Christman | Oct. 9, 1928 |
| 1,791,520 | Bell | Feb. 10, 1931 |